(12) United States Patent
Johnson et al.

(10) Patent No.: US 7,761,531 B2
(45) Date of Patent: Jul. 20, 2010

(54) METHOD AND APPARATUS FOR PROVIDING REMOTE ACCESS OF PERSONAL DATA

(75) Inventors: Kent Johnson, Wichita, KS (US); Jose Solorzano, Wichita, KS (US); Craig Johnson, Bixby, OK (US); Jack Squires, Wichita, KS (US); Steve Newcomb, San Francisco, CA (US)

(73) Assignee: Nokia Corporation, Espoo (FI)

( * ) Notice: Subject to any disclaimer, the term of this patent is extended or adjusted under 35 U.S.C. 154(b) by 1611 days.

(21) Appl. No.: 10/178,423

(22) Filed: Jun. 24, 2002

(65) Prior Publication Data

US 2003/0120784 A1 Jun. 26, 2003

Related U.S. Application Data

(60) Provisional application No. 60/300,789, filed on Jun. 25, 2001.

(51) Int. Cl.
*G06F 15/16* (2006.01)
(52) U.S. Cl. .................... 709/217; 709/219
(58) Field of Classification Search ............. 709/217, 709/219, 202; 726/8
See application file for complete search history.

(56) References Cited

U.S. PATENT DOCUMENTS 5,333,252 A  7/1994  Brewer, III et al.

(Continued)

FOREIGN PATENT DOCUMENTS

WO   WO 00/36812  *  5/2000

OTHER PUBLICATIONS

Defendant and Cross-Complaint Extended Systems, Inc.'s Amended Identification of Prior Art Publications Pursuant to Patent L.R. 3-3(a) Dated Oct. 31, 2003 [Not Prior Art].

(Continued)

*Primary Examiner*—Nathan Flynn
*Assistant Examiner*—Chirag R Patel
(74) *Attorney, Agent, or Firm*—Ditthavong Mori & Steiner, P.C.

(57) ABSTRACT

A method and apparatus for remote access of personal data using a remote device. The personal data is stored on a storage medium in a personal device. The personal data may include personal information of a user of the remote device, or the personal data may be that of another user who intends to share their personal data with the user. The personal device is uniquely associated with the user and may be configured to allow multiple users to access the device. User identification data is received from the remote device. The user is authenticated, using the user identification data received from the remote device, as the user with whom the personal device is associated, either uniquely or through configuration of sharing. When the user is authenticated, menu data is sent to the remote device. The menu data includes a list of personal data management applications on the personal device associated with the user. Selection data is received from the remote device. The selection data identifies one of the personal data management applications from the list as a selected application. From the personal device, a portion of the personal data accessible by the selected application is requested. The requested portion of personal data is received from the storage medium in the personal device and sent to the remote device.

22 Claims, 5 Drawing Sheets

U.S. PATENT DOCUMENTS

| | | | |
|---|---|---|---|
| 5,392,390 | A | 2/1995 | Crozier |
| 5,530,853 | A | 6/1996 | Schell et al. |
| 5,666,530 | A | 9/1997 | Clark et al. |
| 5,706,509 | A | 1/1998 | Tso |
| 5,727,202 | A | 3/1998 | Kucala |
| 5,758,337 | A | 5/1998 | Hammond |
| 5,813,013 | A | 9/1998 | Shakib et al. |
| 5,857,201 | A | 1/1999 | Wright, Jr. et al. |
| 5,926,816 | A | 7/1999 | Bauer et al. |
| 6,247,052 | B1 * | 6/2001 | Huang et al. ............... 709/224 |
| 6,272,074 | B1 | 8/2001 | Winner |
| 6,505,238 | B1 * | 1/2003 | Tran ........................ 709/208 |
| 2002/0077077 | A1 * | 6/2002 | Rezvani et al. ............. 455/410 |
| 2002/0143524 | A1 * | 10/2002 | O'Neil et al. ................. 704/9 |
| 2002/0147810 | A1 * | 10/2002 | Traversat et al. ........... 709/224 |
| 2002/0180579 | A1 * | 12/2002 | Nagaoka et al. ............. 340/3.1 |
| 2002/0188589 | A1 * | 12/2002 | Salmenkaita et al. .......... 707/1 |
| 2003/0023628 | A1 * | 1/2003 | Girardot et al. ............ 707/513 |

OTHER PUBLICATIONS

Hewlett-Packard, Connectivity Pack for the HP 95LX User's Guide, 1991, pp. P0005691-P0005725.

Computer Corporation of America, CCA-1984 Distributed Management of Replicated Data, Final Report, Oct. 9, 1984, pp. SYW000412-SYW000453.

Hewlett-Packard, CPK100LX Connectivity Pack User's Guide for the HP200LX and the HP100LX, 1994, pp. ESI352089-ESI352177.

Oracle, Oracle7TM Server Distributed Systems, vol. II: Replicated Data, Release 7.3, Feb. 1996, pp. ESI009616-ESI010076.

Lotus, LotusMobile Lotus cc: Mail Mobile Release 2, Getting Started Guide, 1993, pp. ESI326581-ESI326769.

Intellilink, IntelliLink for Windows User's Guide, Version 3.0, 1993, pp. SYW000799-SYW000959.

Lotus, Lotus Organizer User' Guide, Release 1.0, 1992, pp. ESI327260-ESI327410.

Time Technology, TT Interchange, 1995, UK, pp. ESI326879-ESI326896.

Sheth, Amit P., A Took for Integrating Conceptual Schemas and User Views, IEEE, 1988, pp. ESI327056-ESI327063.

Mannino et al., Matching Techniques in Global Schema Design, IEEE, 1984, pp. ESI327048-ESI327055.

Oracle, Oracle White Paper, Oracle7WP95 Oracle7TM Distributed Database Technology and Symmetric Replication, Apr. 1995, pp. ESI009052-ESI009080.

Apple Computer, Inc., FileMaker 4 Setting the Data Management Standard, Owner's Manual for Apple Macintosh, 1994, pp. APP/PUMATECH0001-APP/PUMATECH0437.

Goldberg et al., Using Collaborative Filtering to Weave an Information Tapestry, Communications of the ACM, Dec. 1992, vol. 35, No. 12, pp. ESI352338-ESI352347.

Traveling Software, Inc., PC-Link for the Casio B.O.S.S., Release 2, 1989, pp. P0005834-P0005880.

Apple Computer, Inc., NCUManual Newton Connection Utilities User's Manual, 1996, pp. APP/PUMATECH0713-APP/PUMATECH0815.

Syware, DST Guide, Database Subsetting Tool: Introduction to DST& DST Designer's Guide, 1993, pp. SYW000110-SYW000286.

Oracle, Oracle7 Server SQL Reference Manual, Release 7.3, Feb. 1996, pp. ESI010077-ESI010810.

Informix, Informix Guide to SQL Tutorial Version 7.1, Dec. 1994, pp. ESI009100-ESI009615.

Sharp, OL2 Sharp Organizer Link II, Model OZ-890 Operation Manual, no specified date, pp. P0005745-P0005801.

IntelliLink, IntelliLink brochure 1990, pp. P0005731-P0005732.

Now Software, Now Up-to-Date Version 2.0 User's Gulde,1990-92, pp. ESI353130-ESI353461.

Claris, FileMaker® Pro User's Guide, 1992, pp. ESI360607-ESI361026.

Poesio et al., Metric Constraints for Maintaining Appointments: Dates and Repeated Activities, no specified date; pp. ESI353550-ESI353557.

Expert Report of John P. J. Kelly, Ph.D. in Case No. C02-1916 DLJ, USDC, N.D. Cal., 13 pp., dated Oct. 24, 2003.

Compilation of claim charts referred to in Expert Report of John P.J. Kelly, 391 pages.

* cited by examiner

METHOD AND APPARATUS FOR PROVIDING REMOTE ACCESS OF PERSONAL DATA

REFERENCE TO EARLIER-FILED APPLICATION

This application claims the benefit of U.S. Provisional Application No. 60/300,789, entitled "Method and System for Converging Data Networks," filed Jun. 25, 2001.

TECHNICAL FIELD

The present invention relates generally to management of personal data over data networks and, in particular, to providing for remote access of personal data stored in a personal device using a remote device.

BACKGROUND

Many computer users are often away from their personal computers, or wish to share personal data on their computers with other computer users. Thus, it becomes important to provide those users with remote access to and the ability to share personal data that is available on their personal computers. This is especially true for the user who wishes to access his personal data to conduct business while away from his personal computer. "Personal data" of a user relates to information of a personal nature such as email data, contacts data, schedule data, and computer data files, of that user. Other examples of personal data are described below.

For instance, a travelling salesman needs to change an appointment with a customer and confirm that change with the customer. The salesman requires access to his schedule data to record the new time or date of the appointment. Contacts data would then be required to identify an email address or telephone number of the customer. The businessman could then send one type of email data, an email message, to that customer to confirm the new appointment. Additionally, the businessman may wish to view a document file (e.g. a contract) remotely from his computer and then attach that file to an email message to send to the customer for review prior to the new appointment.

Conventional remote access systems exist to provide remote access to personal data stored at some data source. These conventional solutions, however, are generally server-based. That is, the solution involves enabling an existing server such as a Microsoft Exchange Server to make the server remotely accessible over some data network. The remote access server, functioning as the data source, is not owned, operated by, or otherwise associated with a single remote user. Rather, the server is owned by some third party and associated with a plurality of users, such that each user can access one or more accounts on the server. A user's account is provided with a unique user name and password preferably known only to that user. The personal data of respective users is stored at the server or at a third party database having a plurality of accounts managed by the server. A particular user can then access his personal data through his account.

Conventional server-based solutions for providing remote access to personal data are expensive and time-consuming to set up and implement. This is because these server-based solutions are driven not only by software improvements, but also hardware improvements or modifications. An organization desiring to offer remote access to personal data using a server-based solution must generally acquire and implement the necessary server and database hardware. In addition to the costs incurred in obtaining this hardware, the organization must then pay to have the remote access system installed. This project must be completed before any remote access services can be used.

Conventional server-based solutions also present burdens to the remote user. The remote user must rely on the organization operating the server or some other entity to manage his personal data. In addition, because the user's personal data is stored at a shared server rather than his own personal device, the user must regularly synchronize his personal device or devices with his server account. Only in this way can the user maintain consistent versions of his personal data on the various devices.

SUMMARY

Aspects of the present invention relate to a method and apparatus for providing remote access of personal data using a remote device. The personal data is stored on a storage medium in a personal device. The personal data may include personal information of a user of the remote device, or the personal data may be that of another user that has explicitly intended to share their personal data with the user. The personal device is uniquely associated with only one user and may be configured to allow multiple users to access it. User identification data is received from the remote device. The user is authenticated, using the user identification data received from the remote device, as a user with whom personal devices are associated, either uniquely or as a function of sharing. When the user is authenticated, menu data is sent to the remote device. The menu data includes a list of personal devices that the user is allowed to access. Selection data is received from the remote device. The selection data identifies one of the personal devices from the list as the selected device. Additional menu data is then sent to the remote device, which includes a list of personal data management applications on the selected personal device associated with the user. Selection data is received from the remote device. The selection data identifies one of the personal data management applications from the list as a selected application. From the personal device, a portion of the personal data accessible by the selected application is requested. The requested portion of personal data is received from the storage medium in the personal device and sent to the remote device.

DETAILED DESCRIPTION

Figure 1:
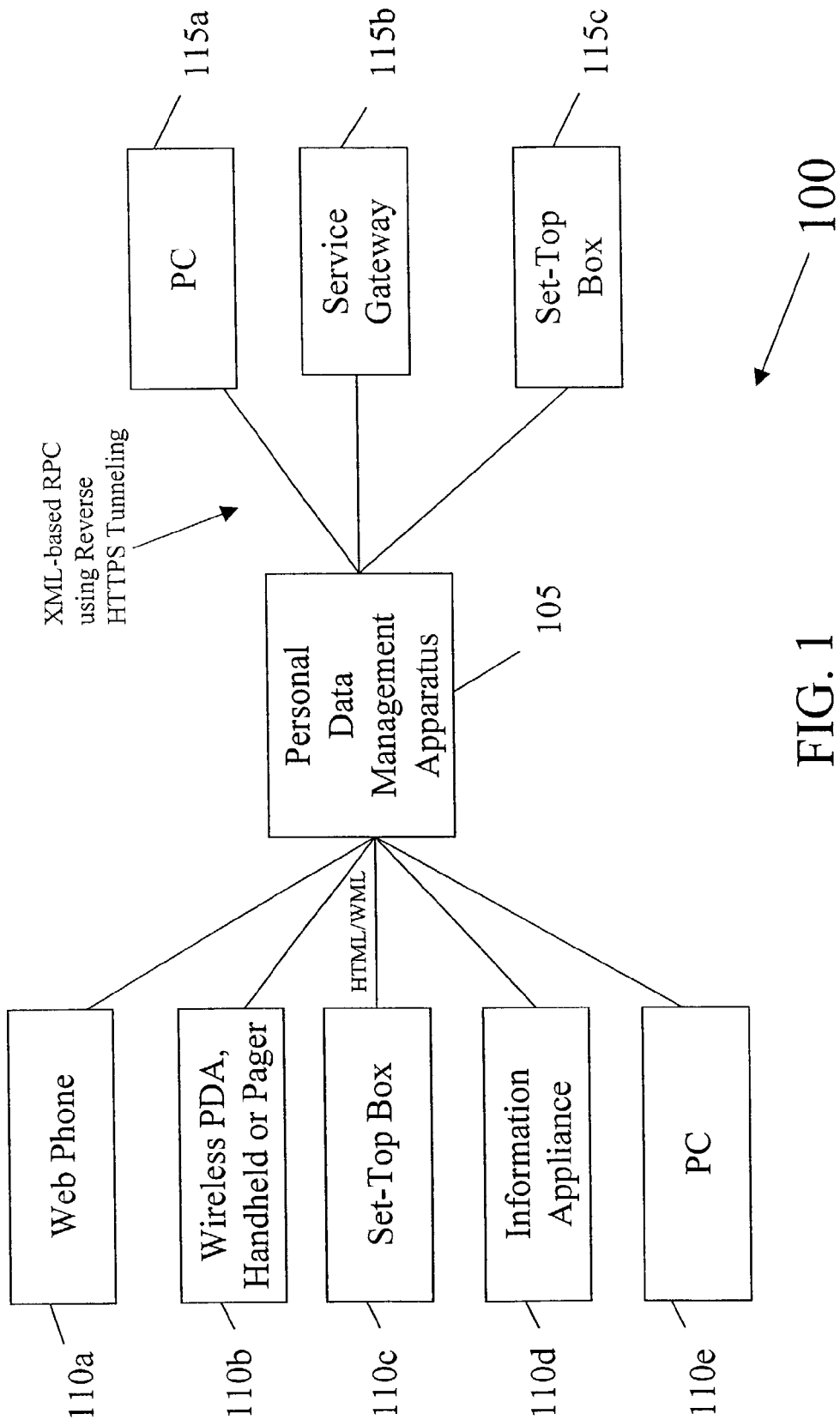
FIG. 1 is a block diagram of a personal data management system 100, constructed according to an exemplary embodiment of the present invention.

FIG. 1 is a block diagram showing an exemplary system 100 for managing personal data. The system 100 includes three portions: a personal data management apparatus 105, a plurality of remote devices 110, and a plurality of personal devices 115.

In FIG. 1, the remote devices 110 include, for example, a web phone 110a, a wireless personal digital assistant (PDA), handheld or pager 110b, a set-top box 110c, an information appliance 110d, and a personal computer (PC) 110e with web browsing capabilities. Examples of remote devices 110 include, but are not limited to, a Nokia 7160 web-enabled mobile phone, a Compaq iPaq H3600 Series PDA, a Palm VIIx PDA, a RIM Blackberry 957 handheld, a RIM Blackberry 950 pager, a Microsoft WebTV set-top box, and a Netpliance I-Opener information appliance. These remote devices 110 provide for remote access by a user of that user's personal data, or another user's personal data if so configured, that is stored at some other location. The remote devices 110 preferably have displays with user interfaces (UIs) through which the user can interact with the remote device. The remote devices 110 are preferably capable of rendering data submitted in a standard markup language format, such as hypertext markup language (HTML) or wireless markup language (WML).

In FIG. 1, the remote devices 110 are capable of communicating with personal data management apparatus 105 over any data network such as a telecom fiber optic transmission network, cellular transmission, wireless transmission, and other telecommunications networks known to those skilled in the art. Other suitable data networks include satellite transmission, radio broadcasting, cable television broadcasting, and direct line-of-site transmission. Still other examples of data networks through which the remote devices 110 can communicate with personal data management apparatus 105 include the Internet, frame relay (FR) networks, ATM networks, wide area networks (WAN), and local area networks (LAN).

In FIG. 1, the personal data management apparatus 105 provides a variety of features to enable remote access of personal data stored on storage media within personal devices 115. The personal data includes personal information of users who operate the remote devices 110a-100e. Examples of personal data include email data, contacts data, schedule data, and computer data files, of that user. The features of personal data management apparatus 105 include authentication of the user and authorization of the user to interact with personal devices 115. In addition, the personal data management apparatus 105 presents to the remote device a menu with a list of personal devices 115 associated with a particular user, either uniquely or through configuration of sharing. This menu of personal devices 115 is unique to the particular user who is authenticated by the apparatus 105. The apparatus 105 also presents menus of available personal data management applications to the remote device 110 operated by the authenticated user for the personal device 115 selected by the user. Such applications include conventional email, contacts, schedule and file access applications. The personal data management apparatus 105 executes interface applications, which interact with the personal devices 115. The particular applications available for each personal device 115 is dependent upon the configuration of the application on the personal device itself. This configuration is passed from the personal device 115 to the personal data management apparatus 105 for the purpose of presenting the appropriate menu list of applications for each personal device 115. These applications request personal data from the personal devices 115 to send to the remote devices 110 for display to the user. The retrieved data is then preferably displayed in HTML or WML form on the remote devices 110. The apparatus 105 integrates with billing systems and also provides logging and reporting functions.

The third portion of FIG. 1 includes the personal devices 115. Typical personal devices include a personal computer 115a, such as a home PC or work PC, a service gateway 115b, and a set-top box 115c. The personal devices 115 are uniquely associated with one particular user, however that user may configure the application on the personal device to share their personal data with other users. For example, suitable personal devices 115 are often devices owned or exclusively operated by that user. Thus, the user will have conveniently stored his or her own personal information on a storage medium within one or more of his personal devices 115. This personal data is easily accessible by conventional personal data management applications, such as email and contacts applications or file browsing applications, operating on the personal devices.

In FIG. 1, the personal devices 115 communicate with the apparatus 105 over a communications path, which is established prior to the user logging into the apparatus 105. This communications path is preferably an XML-based, remote procedure call (RPC) connection, using reverse HTTPS tunneling, established over a broadband network or other data network described above. The personal devices 115 respond to data requests from apparatus 105 via the RPC connection. Also, the personal devices 115 only communicate with the apparatus 105 to maintain security. Thus, users wishing to access these personal devices 115 must be authenticated by apparatus 105 to access personal data on the personal device 115.

Figure 2:
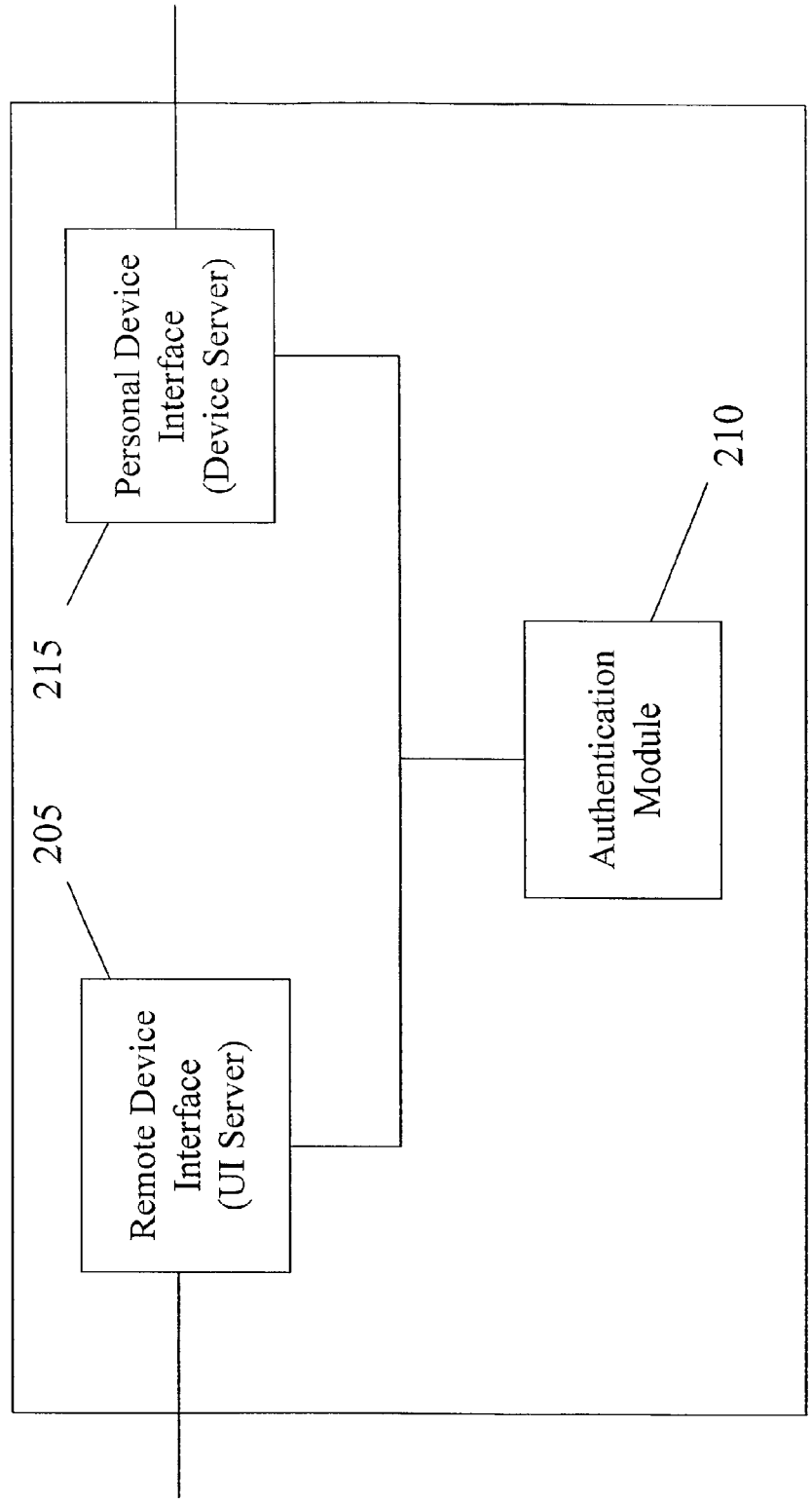
FIG. 2 is a block diagram of a personal data management apparatus 105 for providing remote access of personal data stored on a storage medium in a personal device, constructed according to an exemplary embodiment of the present invention.

As shown in FIG. 2, personal data management apparatus 105 includes a remote device interface (device server) 205, an authentication module 210, and a personal device interface (UI server) 215. In one example, apparatus 205 includes the following hardware and software configuration. One or more load balancer devices (e.g. Radware WSD Pro or F5 BigIP) handle proper distribution of the information requests from both remote devices 110 and from personal devices 115. Two or more UI & Device Server devices (e.g. AMD 800 MHz, Red Hat Linux 7.2, 20 GB hard drive, 512 MB RAM) handle the actual processing work performed by remote device interface 205, the authentication module 210, and the personal device interface 215. The remote device interface supports remote devices 110 and provides multiple views such as a Nokia WML view, a UP WML view, an HTML view and other similar views for the various remote devices 105. In this way, data in an appropriate format can be sent from apparatus 105 to a particular remote device 110 for display on that remote device. The views provide defined pages including an "email list page," a "show email page," and others. Pages are implemented using Java-server pages (JSP) with custom tags (which allow Web authors to introduce structure to a document while associating style with that structure) so that methods can be invoked via the XML-based RPC connection on the personal devices 115.

The operation of personal data management apparatus 105 in FIG. 2 is described with reference to the flow diagram 300 shown in FIG. 3. In step 305, an authentication procedure is performed for a user attempting to log into the apparatus 105. The user operates one of remote devices 110, in this example, web phone 110a, to establish communications with the remote device interface 205 of apparatus 105. Once communications are established, the user sends user identification data from remote device 110a to personal data management apparatus 105. One example of user identification data includes a unique user name and password of the user operating remote device 110a. Upon receipt of the user identification data from remote device 110a, authentication module 210 within apparatus 105 authenticates the user, using the submitted user identification data. The authentication module 210 verifies that the submitted user identification data identifies the particular user for whom an account is maintained by apparatus 105. Such accounts are maintained for respective users of the remote devices 110. Each account provides a unique list of personal devices 115 associated with each particular user, either uniquely or through configuration of sharing. Generally, each personal device 115 is uniquely associated with only a single user, although access to the device 115 may be shared with other users. Each account also provides a list of personal data management applications associated with the user. These lists are customized for each particular user of the apparatus 105. In this way, the authentication module can identify the user, using the user identification data received from the remote device, as the user with whom one or more of the personal devices 115 are associated, either uniquely or through a sharing configuration.

Figure 3:
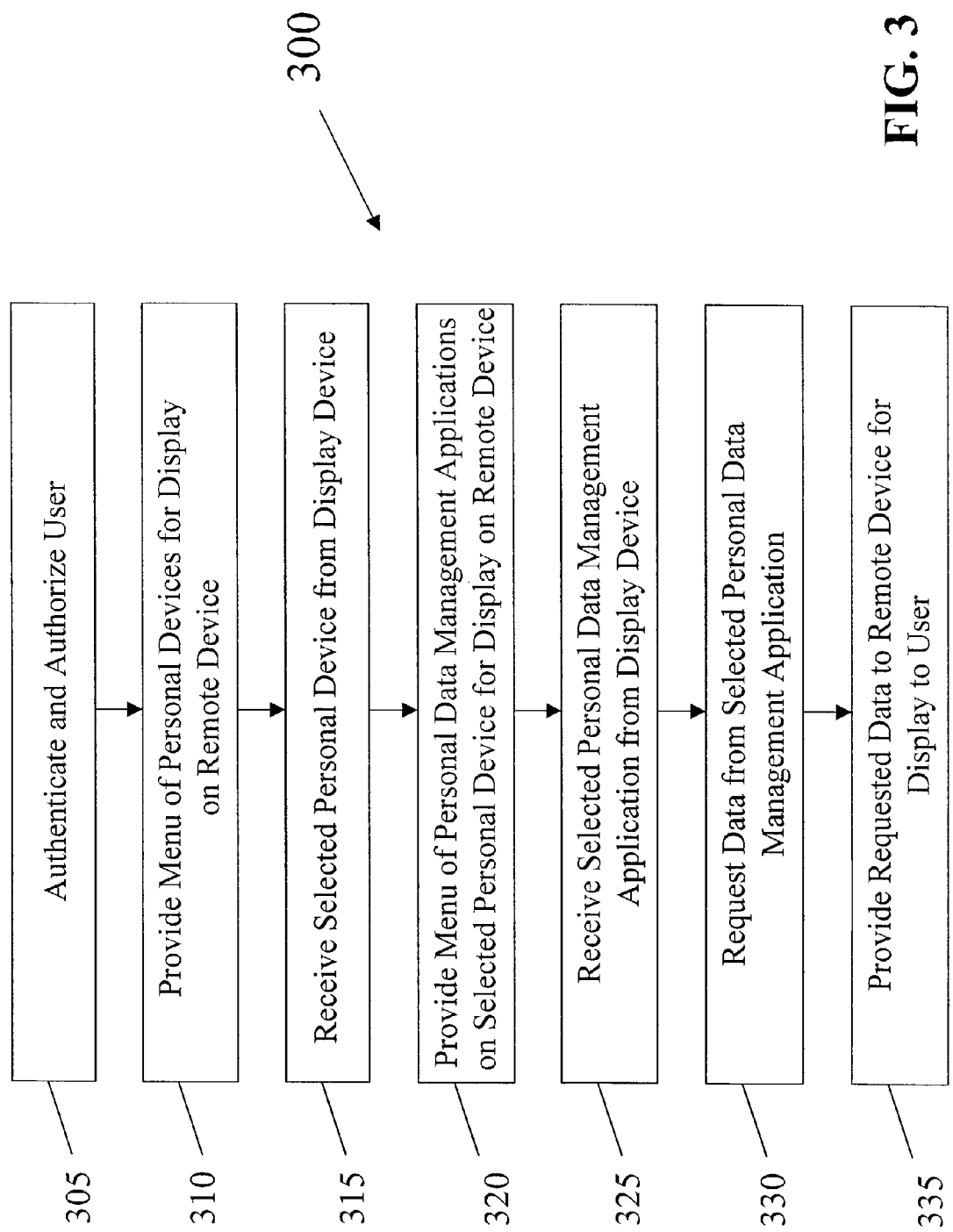
FIG. 3 is a flow diagram of a method 300 for providing remote access of personal data stored on a storage medium in a personal device, performed in accordance with an exemplary embodiment of the present invention.

In step 310 of FIG. 3, the remote device interface 205 of apparatus 105 provides a menu of personal devices to remote device 110 for display to the user. This first menu data sent by apparatus 105 includes a list of the personal devices 115 associated with the user, either uniquely or through configuration of sharing. Upon receipt of the first menu data by the remote device 110a, the menu is displayed on the GUI of remote device 110a for the user. The user then reviews the list of personal devices and selects one of the devices, in this example, PC 115a, for remote access. The user makes this selection using a keypad or other data entry mechanism built into the remote device 110a. The remote device 110a sends first selection data identifying PC 115a as a selected personal device.

In step 315 of FIG. 3, the remote device interface 205 of apparatus 105 receives the first selection data. The apparatus 105 then registers the selected personal device as the device on which personal data is stored that the user wishes to access. In step 320, the remote device interface 205 sends to the remote device 110a second menu data for display on the remote device 110a. This second menu data includes a list of personal data management applications on the personal device selected by the user in step 315. This list is configurable per user from within the application on the personal device itself. Typical personal data management applications include email applications, contacts applications, schedule or calendar applications, and file access applications. Examples of commercially available applications that typically reside on the personal devices 115, that may contain personal data or be used for personal data management directly on these personal devices 115, include but are not limited to Microsoft Outlook, Microsoft Outlook Express, Microsoft Windows file explorer, and Microsoft Internet Explorer. Such applications are used to manage personal data by the user, as will be understood by those skilled in the art.

In step 325 of FIG. 3, the remote device interface 205 of apparatus 105 receives from the remote device 110a second selection data identifying a selected application from the list of personal data management applications. This selection is made and submitted by the user of remote device 110a in substantially the same manner as selecting a personal device.

In step 330, after remote device interface 205 receives the selection data from remote device 110a, the personal device interface 215 of personal data management apparatus 105 communicates with the selected personal device to request a portion of the personal data accessible by the selected application from the selected personal device. The selected personal device retrieves the requested personal data from the storage medium therein and sends this data to the apparatus 105 over the communications path established between the personal devices 115 and the apparatus 105. The personal device interface 215 receives the requested personal data over this communications path.

In step 335 of FIG. 3, the remote device interface 205 then provides the requested personal data to the remote device. The requested personal data can then be displayed to the user on the UI of remote device 110a. Such personal data may include email data, for instance, when the selected personal data management application is an email application. The user can continue to interact with apparatus 105 in the manner described above to select other personal data management applications and request additional data as needed.

In one example; the requested personal data is a list of email folders managed by an email application. Upon receipt of a list of email folders by remote device 110a, the user can select one of the folders to access email messages within that folder. Thus, further selection data is sent from the remote device 110a to the remote device interface 205 so that the personal device interface 215 can retrieve the particular email messages from the selected email folder on the selected personal device. These messages are then sent back to the remote device 110a for display to the user and further interaction.

Figure 4:
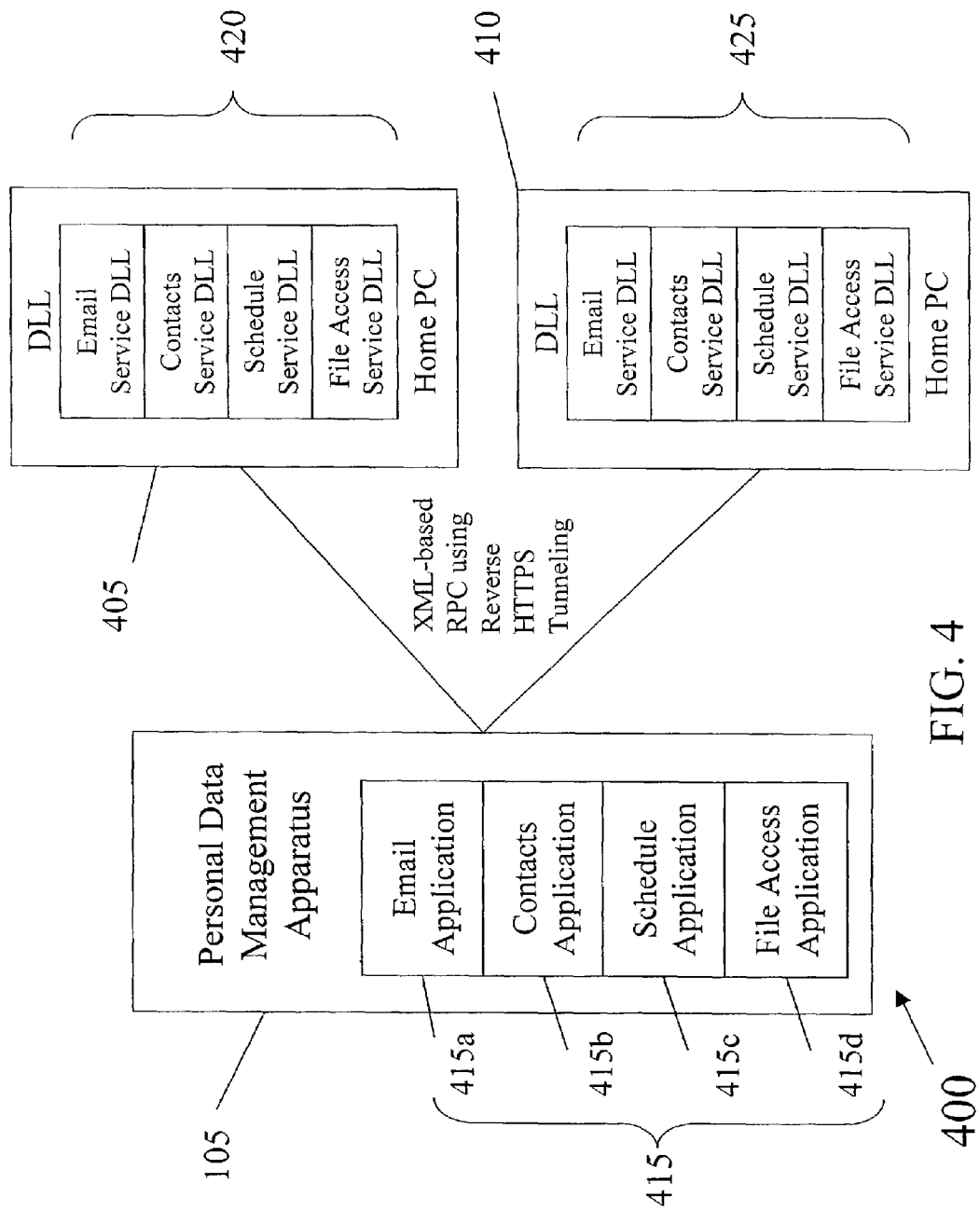
FIG. 4 is a block diagram of a personal data management apparatus and personal devices, constructed according to exemplary embodiments of the present invention.

FIG. 4 shows the personal data management apparatus 105 and typical personal devices 115 of FIG. 1. In FIG. 4, the personal devices 115 include a home PC 405 and work PC 410. As shown in FIG. 4, the apparatus 105 includes interface applications 415 which, when executed, interact with related personal data management applications on personal devices 405 and 410. These interface applications 415 are provided as part of personal device interface 215 of FIG. 2. For instance, email application 415a on apparatus 105 interfaces and interacts with an email application on the home personal computer 405 or work personal computer 410.

As shown in FIG. 4, home PC 405 preferably includes a plurality of dynamic linked library (DLL) modules 420. Work PC 410 also includes a plurality of DLL modules 425. These DLL modules are desirable as the modules provide a middle layer situated between corresponding interface applications 415a-415c on apparatus 105 and personal data management applications on the personal devices 405 and 410. For instance, on home PC 405, the email service DLL interacts with both email interface application 415a of apparatus 105 and an email application on home PC 405.

In step 325 of FIG. 3, when the user selects a particular personal data management application, such as an email application, the email interface application 415a of apparatus 105 in FIG. 4 is executed. The executed application 415a communicates with an email service DLL on the selected personal device. The email service DLL interacts with an email application on that personal device to retrieve personal data, such as email folders, from a storage medium therein. The personal data is preferably returned to the apparatus 105 in extensible markup language (XML) format. The remote device interface 205 in apparatus 105 receives the XML data from the source device interface 215, formats the data in HTML, WML or other suitable form, and then sends the personal data to the remote device. The user can then view titles of new email messages in the folders. The process repeats as the user selects individual folders, requests full email messages and other personal data from the selected personal device.

In FIG. 4, an overall application containing the DLL modules 420 and 425 in the personal devices opens "reverse" socket connections to the apparatus 105. These reverse socket connections provide the established communications paths through which the interface applications 415 of apparatus 105 can then communicate with the personal devices 405 and 410. The reverse socket connections establish open ports between respective personal devices and apparatus 105 before the authentication procedure 305 of FIG. 3 is performed. The sockets or ports remain open through authentication and as data is retrieved from personal devices 405 and 410 and delivered by apparatus 105. A personal device initiates the socket by opening a port to the apparatus 105, and then holds that port open for personal data requests from the apparatus 105. This "reverse" socket methodology is beneficial because security of the personal devices is easily maintained. All data requests must pass through the apparatus 105 after the authentication procedure has been performed. Firewalls and other security measures are not required to protect the personal devices, so long as the only communications path to the personal devices is through the apparatus 105.

In FIG. 4, the DLL modules are deployed as executable files and preferably coded in C++. The DLL modules receive personal data requests from the apparatus 105 in the form of XML-based RPC calls from the interface applications 415. A typical RPC call is an XML structure specifying a method to invoke and various parameters, often including a particular format for the requested personal data when the data is returned. In one example, an RPC call, "getfolders," is passed from email interface application 415a to the email service DLL module in home PC 405. The email interface application 415a passes with the call a parent folder ID. The email service DLL receives the call, and then communicates with an email application on the home PC 405 to retrieve the requested email folders. In particular, the email service DLL invokes a method call on the email application to retrieve the requested personal data. The retrieved data is then returned to the apparatus 105.

The use of RPC calls is beneficial because a device or system on one end of a socket can call a system on the other end, and the two systems can communicate with one another via XML. This holds true even if the systems are running different implementation languages. Thus, as long as both systems understand XML and have implemented the defined interface between them, heterogeneous systems can communicate with each other.

Figure 5:
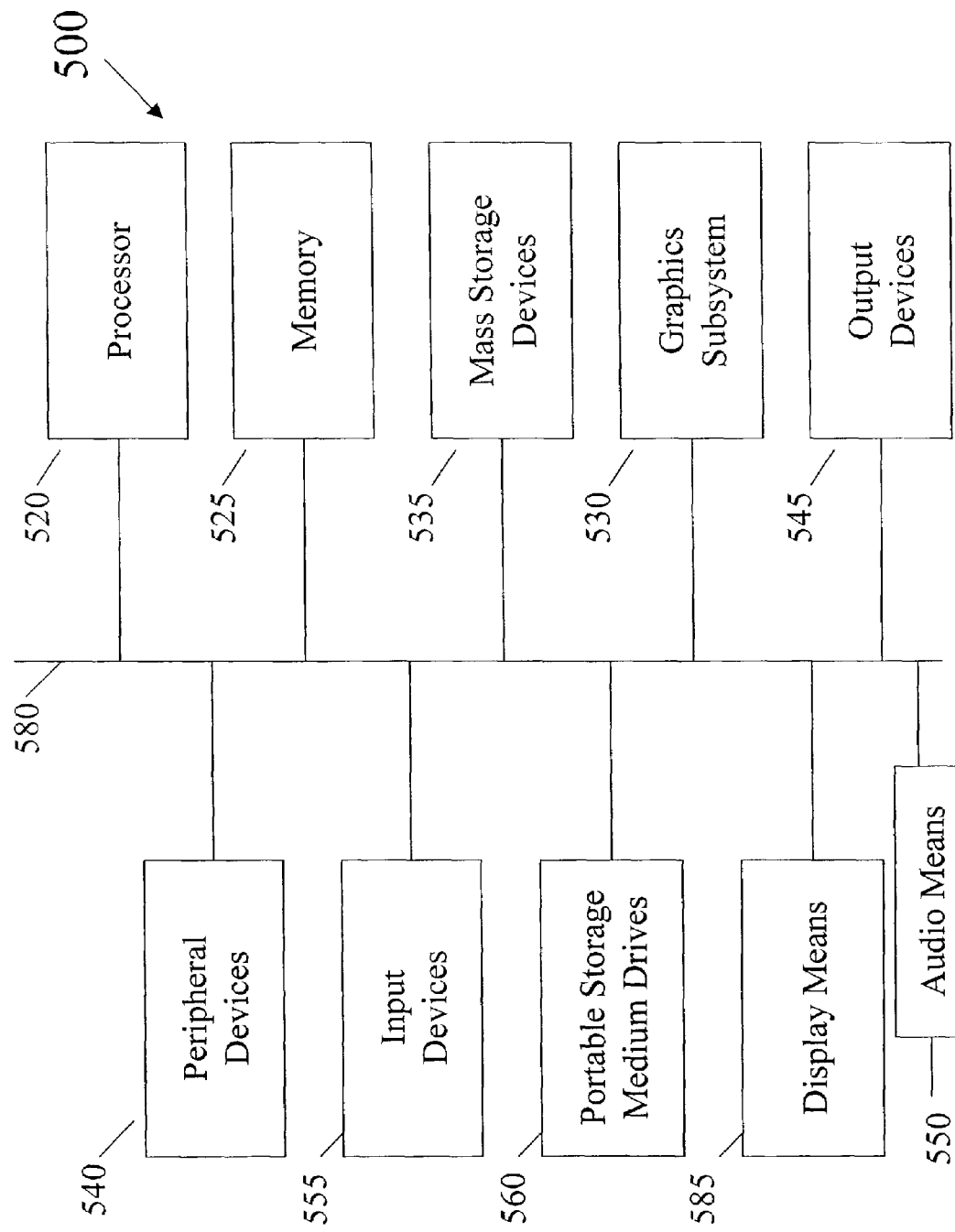
FIG. 5 is a block diagram of a data processing device 500 constructed according to an exemplary embodiment of the present invention.

FIG. 5 is a block diagram of a data processing device 500 constructed according to an exemplary embodiment of the present invention. This device 500 provides at least part of the inner hardware structure of data processing apparatus 105, remote devices 110, and personal devices 115 of FIG. 1. Those skilled in the art will understand that combinations of software programs and the hardware of FIG. 5 are used to realize the "interfaces" and "modules" within apparatus 105, as well as the remote devices and personal devices described above.

In FIG. 5, the data processing device 500 includes a processor 520 for executing program instructions stored in a memory 525. In some embodiments, processor 520 includes a single microprocessor, while in others, processor 520 includes a plurality of microprocessors to define a multi-processor system.

In FIG. 5, the memory 525 stores instructions and data for execution by processor 520, including instructions and data for performing the methods described above. Depending upon the extent of software implementation in data processing device 500, the memory 525 stores executable code when in operation. The memory 525 includes, for example, banks of read-only memory (ROM), dynamic random access memory (DRAM), as well as high-speed cache memory.

In FIG. 5, within data processing device 500, an operating system comprises program instruction sequences that provide a platform for the methods described above. The operating system provides a software platform upon which application programs may execute, in a manner readily understood by those skilled in the art. The data processing device 500 further comprises one or more applications having program instruction sequences for performing the methods described above.

In FIG. 5, the data processing device 500 incorporates any combination of additional devices. These include, but are not limited to, a mass storage device 535, one or more peripheral devices 540, an audio means 550, one or more input devices 555, one or more portable storage medium drives 560, a graphics subsystem 530, a display means 585, and one or more output devices 545.

In FIG. 5, the various components are connected via an appropriate bus 580 as known by those skilled in the art. In alternative embodiments, the components are connected through other communications media known in the art. For purposes of simplicity, the components shown in FIG. 5 are depicted as being connected via a single bus 580 (i.e. transmitting means). However, the components may be connected through one or more data transport means (e.g. Internet, Intranet, etc.). In one example, processor 520 and memory 525 are connected via a local microprocessor bus; while mass storage device 535, peripheral devices 540, portable storage medium drives 560, and graphics subsystem 530 are connected via one or more input/output ("I/O") buses.

In FIG. 5, mass storage device 535 is implemented as fixed and/or removable media, for example, as a magnetic, optical, or magneto-optical disk drive. The drive is preferably a non-volatile storage device for storing data and instructions for use by processor 520. In some embodiments, mass storage device 535 stores client and server information, code for carrying out methods in accordance with exemplary embodiments of the invention, and computer instructions for processor 520. In other embodiments, computer instructions for performing methods in accordance with exemplary embodiments of the invention also are stored in processor 520. The computer instructions are programmed in a suitable language such as Java or C++.

In FIG. 5, the portable storage medium drive 560, in some embodiments, operates in conjunction with a portable non-volatile storage medium, such as a floppy disk, CD-ROM, or other computer-readable medium, to input and output data and code to and from the data processing device 500. In some embodiments, methods performed in accordance with exemplary embodiments of the invention are implemented using computer instructions that are stored on such a portable medium and input to the data processing device 500 via portable storage medium drive 560.

In FIG. 5, the peripheral devices 540 include any type of computer support device, such as an I/O interface, to add functionality to data processing device 500. In one example, the peripheral devices include a network interface card for interfacing the data processing device 500 to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 5, the graphics subsystem 530 and the display means 585 provide output alternatives of the device. The graphics subsystem 530 and display means 585 include conventional circuitry for operating upon and outputting data to be displayed, where such circuitry preferably includes a graphics processor, a frame buffer, and display driving circuitry. The display means 585 may include a cathode ray tube (CRT) display, a liquid crystal display (LCD), or other suitable devices. The display means 585 preferably can display at least 256 colors. The graphics subsystem 530 receives textual and graphical information and processes the information for output to the display means 585. A video card in the data processing device 500 also comprises a part of graphics subsystem 530 and also preferably supports at least 256 colors. For optimal results in viewing digital images, the user should use a video card and monitor that can display the True Color (24 bit color) setting. This setting enables the user to view digital images with photographic image quality.

In FIG. 5, audio means 550 preferably includes a sound card, on-board sound processing hardware, or a device with built-in processing devices that attach via Universal Serial Bus (USB) or IEEE 1394 (Firewire). The audio means 550 receives audio signals from a peripheral microphone. In addition, audio means 550 may include a processor for processing sound. The signals can be processed by the processor in audio means 550 of data processing apparatus 500 and passed to other devices as, for example, streaming audio signals.

The devices contained in the data processing device of FIG. 5 are those typically found in general purpose computers, and are intended to represent a broad category of such computer components that are well known in the art. The system of FIG. 5 illustrates one platform which can be used for practically implementing methods performed in accordance with the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and the like.

In some embodiments, programs for performing methods in accordance with exemplary embodiments of the invention are delivered as computer program products. These generally include a processor readable storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or another mechanism utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network. Suitable networks include a frame relay network, an ATM network, a wide area network (WAN) such as the Internet, or a local area network (LAN). In one embodiment, the method of the present invention is implemented in computer instructions and those computer instructions are transmitted in an electronic signal through cable, satellite or other transmitting means for transmitting the computer instructions in the electronic signals.

Those skilled in the art should understand that the terms "computer program product," "processor readable storage medium," "computer readable medium," and "carrier wave" are used interchangeably herein. Further, those skilled in the art will recognize that merely transferring the program over the network, rather than executing the program on a computer system or other device, does not avoid the scope of the invention.

Stored on any one of the computer readable media, embodiments of the present invention include software for controlling both the hardware of the general purpose/specialized computer or microprocessor, and for enabling the computer or microprocessor to interact with a human user or another mechanism utilizing the results of the present invention. Such software may include, but is not limited to, device drivers, operating systems and user applications. Ultimately, such computer readable media further includes software for performing exemplary methods of the present invention as described above.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method comprising:

authenticating a user, using user identification data received from a remote device, as the user with whom personal devices are associated, either uniquely or by sharing;

causing, at least in part, sending first menu data to the remote device, the first menu data including an identification of the personal devices associated with the user;

receiving, from the remote device, first selection data identifying one of the personal devices from the identification as a selected personal device;

causing, at least in part, sending second menu data to the remote device, the second menu data including an identification of personal data management applications on the selected personal device associated with the user;

receiving, from the remote device, second selection data identifying a selected application from among the identification of personal data management applications;

requesting, from the selected personal device, a portion of personal data accessible by the selected application, the personal data comprises personal information associated with the user of the remote device or an individual intending to share the personal data with the user;

receiving, from the selected personal device, the requested portion of personal data; and causing, at least in part, sending the requested portion of personal data to the remote device.

2. The method of claim 1, wherein the selected personal device is either a personal computer, a service gateway, or a set-top box.

3. The method of claim 1, wherein the requested portion of personal data includes either email data, contact data, schedule, calendar data, or computer data file.

4. An apparatus comprising a processor and a memory storing executable instructions that in response to execution by the processor cause the apparatus to at least perform the following:
- authenticating a user, using user identification data received from a remote device, the user identification data comprises information identifying the user with whom personal devices are associated, either uniquely or by sharing.,
- sending first menu data to the remote device, the first menu data including an identification of the personal devices associated with the user;
- receiving, from the remote device, first selection data identifying one of the personal devices from the identification as a selected personal device;
- sending second menu data to the remote device, the second menu data including an identification of personal data management applications on the selected personal device associated with the user;
- receiving from the remote device, second selection data identifying one of the personal data management applications from the identification as a selected application;
- requesting, from the personal device, a portion of personal data accessible by the selected application, the personal data comprises personal information of the user of the remote device or an individual intending to share the personal data with the user;
- receiving, from the selected personal device, the requested personal data; and
- sending the requested personal data to the remote device.

5. The method of claim 4, wherein the remote device is a web phone.

6. The apparatus of claim 4, further comprising an interface in communication with only the personal device over a communications path, wherein the communications path comprises an extensible markup language (XML)-based remote procedure call (RPC) connection.

7. A computer program product comprising at least one non-transitory computer readable storage medium having computer readable program code portions stored therein, the computer readable program code portions comprising non-transitory computer-readable storage medium carrying one or more sequences of one or more instructions which, when executed one or more processors, cause an apparatus to at least perform the following steps:
- authenticating a user, using user identification data received from a remote device, as the single user with whom personal devices are associated, either uniquely or by sharing;
- sending first menu data sent to the remote device, the first menu data including an identification of the personal devices associated with the user;
- receiving first selection data from the remote device, the first selection data identifying one of the personal devices from the identification as a selected personal device;
- sending second menu data to the remote device, the second menu data including an identification of personal data management applications on the selected personal device associated with the user;
- receiving second selection data-from the remote device, the second selection data identifying one of the personal data management applications from the identification as a selected application;
- requesting, from the personal device, a portion of personal data accessible by the selected application, the personal data comprises personal information associated with the user of the remote device or an individual intending to share the personal data with the user,
- receiving the requested portion of personal data from the personal device; and
- sending the requested portion of personal data to the remote device.

8. A non-transitory computer-readable storage medium of claim 7, wherein the selected application is an email application, a contacts application, a schedule application, or a file access application.

9. An apparatus comprising a processor and a memory storing executable instructions that in response to execution by the processor cause the apparatus to at least perform the following:
- receiving first menu data from a device, when a user is authenticated by evaluating the user identification which comprises information identifying the user with whom personal devices are associated, either uniquely or by sharing, the first menu data including an identification of personal devices associated with the user;
- causing, at least in part, sending, to the device, first selection data identifying one of the personal devices from the identification as a selected personal device;
- receiving second menu data from the device, the second menu data including an identification of personal data management applications on the selected personal device associated with the user;
- generating a request for a portion of personal data based on receipt of second selection data from the device, the second selection data identifying one of the personal data management applications from the identification as a selected application; and
- receiving, from selected personal device, the requested portion of the personal data that is accessible by the selected application, the personal data comprises personal information of the user of the device or an individual intending to share the personal data with the user.

10. The apparatus of claim 9, wherein the apparatus is associated with the user, either uniquely or by sharing.

11. The apparatus of claim 9, wherein the selected personal device comprises at least one of a personal computer, a service gateway, or a set-top box.

12. The apparatus of claim 9, wherein the selected application is at least one of an email application, a contacts application, a schedule or calendar application, or a file access application.

13. The method of claim 1, further comprising:
- determining that the personal device is owned or exclusively operated by the user; and
- configuring the selected application on the personal device to share the personal data with one or more other users.

14. A non-transitory computer-readable storage medium of claim 7, wherein the apparatus is caused, at least in part, to further perform:
- determining that the personal device is owned or exclusively operated by the user; and
- utilizing data associated with the selected application on the personal device to share the personal data with one or more other users.

15. The apparatus of claim 9, wherein the apparatus is further caused, at least in part, to:
- determine that the personal device is owned or exclusively operated by the user; and configure the selected application on the personal device to share the personal data with one or more other users.

16. The apparatus of claim 4, wherein the apparatus is further caused, at least in part, to:

analyze the user identification data to identify an account maintained on behalf of the user, wherein the account comprises information identifying a plurality of personal devices owned or operated by the user and a plurality of personal data management applications stored on respective ones of personal devices.

17. The method of claim 1, wherein the personal data is stored in a memory in the selected personal device.

18. The method of claim 1, wherein the portion comprises a list of email folders, the method further comprising:

receiving a selection of at least one of the folders to permit access to one or more files within the at least one selected folder.

19. The apparatus of claim 4, wherein the personal data is stored in a memory in the selected personal device.

20. The apparatus of claim 4, wherein the portion comprises a list of email folders, and the apparatus is further caused, at least in part, to:

receiving a selection of at least one of the folders to permit access to one or more files within the at least one selected folder.

21. A non-transitory computer-readable storage medium of claim 7, wherein the personal data is stored in a memory in the selected personal device.

22. A non-transitory computer-readable storage medium of claim 7, wherein the apparatus is caused, at least in part, to further perform:

selecting at least one of the folders to be received to permit access to one or more files within the at least one selected folder.

* * * * *

UNITED STATES PATENT AND TRADEMARK OFFICE
CERTIFICATE OF CORRECTION

PATENT NO. : 7,761,531 B2
APPLICATION NO. : 10/178423
DATED : July 20, 2010
INVENTOR(S) : Kent Johnson et al.

It is certified that error appears in the above-identified patent and that said Letters Patent is hereby corrected as shown below:

Title Page item 73 Assignee information should read: INTELLISYNC CORPORATION

Signed and Sealed this
Fourteenth Day of June, 2011

David J. Kappos
*Director of the United States Patent and Trademark Office*